(12) United States Patent
Gubbi Lakshminarasimha et al.

(10) Patent No.: US 10,679,098 B2
(45) Date of Patent: Jun. 9, 2020

(54) METHOD AND SYSTEM FOR VISUAL CHANGE DETECTION USING MULTI-SCALE ANALYSIS

(71) Applicant: Tata Consultancy Services Limited, Mumbai (IN)

(72) Inventors: Jayavardhana Rama Gubbi Lakshminarasimha, Bangalore (IN); Akshaya Ramaswamy, Bangalore (IN); Sandeep Nellyam Kunnath, Bangalore (IN); Ashley Varghese, Bangalore (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 185 days.

(21) Appl. No.: 15/902,079

(22) Filed: Feb. 22, 2018

(65) Prior Publication Data

US 2019/0164009 A1 May 30, 2019

(30) Foreign Application Priority Data

Nov. 29, 2017 (IN) .............................. 201721042809

(51) Int. Cl.
| | | |
|---|---|---|
| *G06K 9/00* | (2006.01) | |
| *G06K 9/62* | (2006.01) | |
| *G06T 3/40* | (2006.01) | |
| *G06T 7/254* | (2017.01) | |

(52) U.S. Cl.
CPC ......... *G06K 9/6215* (2013.01); *G06K 9/0063* (2013.01); *G06K 9/6202* (2013.01); *G06T 3/4053* (2013.01); *G06T 7/254* (2017.01); *G06T 2207/20016* (2013.01)

(58) Field of Classification Search
None
See application file for complete search history.

(56) References Cited

U.S. PATENT DOCUMENTS

| | | | |
|---|---|---|---|
| 2010/0098342 A1* | 4/2010 | Davis ................... | G06K 9/0063 382/220 |
| 2014/0316614 A1 | 10/2014 | Newman | |
| 2015/0248584 A1* | 9/2015 | Greveson ................. | G06T 7/73 382/113 |
| 2015/0332122 A1* | 11/2015 | Zheng ....................... | G06T 7/11 382/173 |
| 2017/0061217 A1 | 3/2017 | Cha et al. | |

* cited by examiner

*Primary Examiner* — Wei Wen Yang
(74) *Attorney, Agent, or Firm* — Finnegan, Henderson, Farabow, Garrett & Dunner LLP

(57) ABSTRACT

The disclosure herein generally relate to scene change detection, and, more particularly, to use of Unmanned Vehicle (UV) to inspect a scene and perform a scene change detection using UVs. When a UV performs visual inspection of an area or an object, due to various factors, such as but not limited to environmental factors, and movement of object and/or the UV, image of the area/object captured by the drone lacks clarity, which in turn makes detection of any object a difficult task. The UV disclosed herein uses a multi scale super pixel technique for visual change detection, in order to solve the aforementioned issues. In an embodiment, the UV captures an image, identifies a reference image that matches the captured image, and generates a change map. The multi-scale super pixel analysis is then performed on this change map to detect changes between the captured image and the reference image.

9 Claims, 6 Drawing Sheets

(a) Captured image        (b) Reference image (c) Change detected

METHOD AND SYSTEM FOR VISUAL CHANGE DETECTION USING MULTI-SCALE ANALYSIS

PRIORITY CLAIM

This U.S. patent application claims priority under 35 U.S.C. § 119 to: India Application No. 201721042809, filed on 29 Nov. 2017. The entire contents of the aforementioned application are incorporated herein by reference.

TECHNICAL FIELD

This disclosure relates generally to scene change detection, and more particularly to use of Unmanned Vehicle (UV) to inspect a scene and perform a scene change detection using UVs.

BACKGROUND

Immense research in the field of automation, assisted by significant technological advancements, has resulted in significant growth of Unmanned Vehicles (UVs), and as a result, the UVs are used in multiple fields of application. For example, the Unmanned Aerial Vehicle (UAV/drone) is one popular type of UV, is used for transportation of object from one location to other, for inspection of locations and objects, and so on. Applications in which a UV is required to perform visual inspection, appropriate image processing techniques are to be used by the UV to effectively process a captured image to achieve a desired result.

The inventors here have recognized certain technical problems with such conventional systems being used for visual inspection and change detection, as explained below. One difficulty that existing UVs face while doing visual inspection is that images captured as part of the visual inspection may lack quality due to factors such as but not limited to movement of the UV, lighting conditions, wind, and dust/smoke in the air. As a result, the overall quality of output from the UV is less in such situations.

SUMMARY

Embodiments of the present disclosure present technological improvements as solutions to one or more of the above-mentioned technical problems recognized by the inventors in conventional systems. For example, in one embodiment, a processor-implemented method for change detection using an Unmanned Vehicle (UV) is provided. In this method, the UV captures at least one image of a target, via one or more hardware processors, and by comparing the captured at least one image with a plurality of reference images, identifies a reference image that matches the captured image. Then, a similarity map is generated based on the captured at least one image and the reference image, via the one or more hardware processors, by the UV, wherein the similarity map highlights changes between the captured at least one image and the reference image. Further, differences between the captured at least one image and the reference image are extracted by performing a multi-scale super pixel analysis of the similarity map, via the one or more hardware processors, by the UV.

In another embodiment, an Unmanned Vehicle (UV), comprising a processor; and a memory module comprising a plurality of instructions. The plurality of instructions are configured to cause the processor to capture at least one image of a target, via one or more hardware processors, by an image capturing module of the UV. Further an image processing module of the UV identifies a reference image that matches the captured at least one image, from a plurality of reference images. Then, a similarity map is generated based on the captured at least one image and the reference image, via the one or more hardware processors, by the image processing module, wherein the similarity map highlights changes between the captured at least one image and the reference image. Further, differences between the captured at least one image and the reference image are extracted by performing a multi-scale super pixel analysis of the similarity map, via the one or more hardware processors, by the image processing module.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
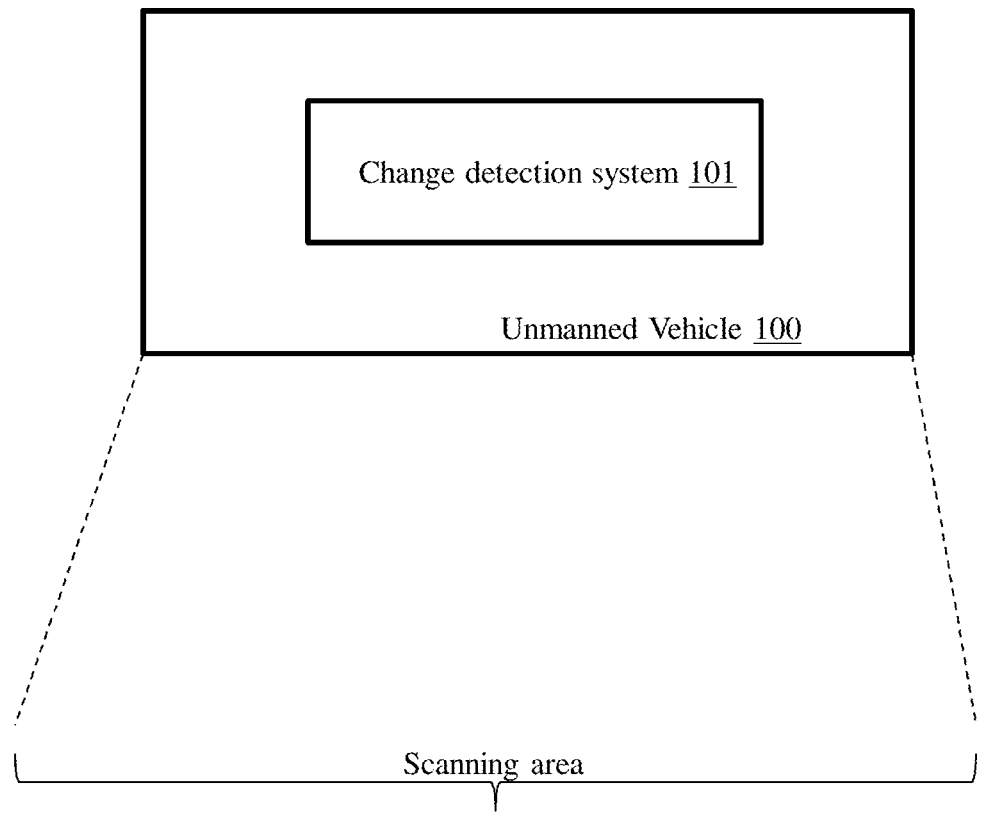
FIG. 1 illustrates an exemplary block diagram depicting an Unmanned Vehicle (UV) used for change detection, according to some embodiments of the present disclosure.

FIG. 1 illustrates an exemplary block diagram depicting an Unmanned Vehicle (UV) used for change detection, according to some embodiments of the present disclosure. The UV includes a change detection system 101 in addition to the other components. The UV 100, using the change detection system 101, performs change detection, wherein the change detection involves detection of change in a scene based on at least two images of the scene captured at different time periods. Assume that a particular scene is to be checked for any change happened over a period of time. For example, in a warehouse, at least location of objects move frequently. So while inspecting each area of the warehouse, the UV can compare images of each area, captured over different time periods, to identify what all changes have happened. In this process, an image captured initially (of the same scene) is used as a reference image, and the at least one image of the scene is compared with the reference image, so as to determine any change(s).

The UV 100 is configured to maneuver to a scene where the change detection is to be performed, and capture at least one image of the scene, using an image capturing module (camera) of the UV. The captured at least one image of the scene is then collected as input by the change detection system 101.

The change detection system 101 processes the captured at least one image, and identifies difference(s), if any, between the captured at least one image and a corresponding reference image. The change detection system 101 uses a multi-scale super pixel based image processing schema so as to process the images and perform change detection. In this process, the change detection system 101 generates multiple super-pixels of the captured at least one image, at different scales, and further generates change maps at different scales. These change maps are then combined to generate a combined change map, which in turn is used to identify overlapping regions between the combined change map and the reference image. With this comparison, the change detection system 101 identifies differences between the captured at least one image and the corresponding reference images as the change(s) happened at the scene. The combined change map contain data in the form of binary data. Areas in the change map with value close to value '1' are identified as the areas where change is present. In an embodiment, closeness of value in an area of the change map to the value '1' is identified in terms of a threshold range, which is pre-defined. If degree of closeness falls within the threshold range, then the corresponding area is identified as the area where change is present.

Figure 2:
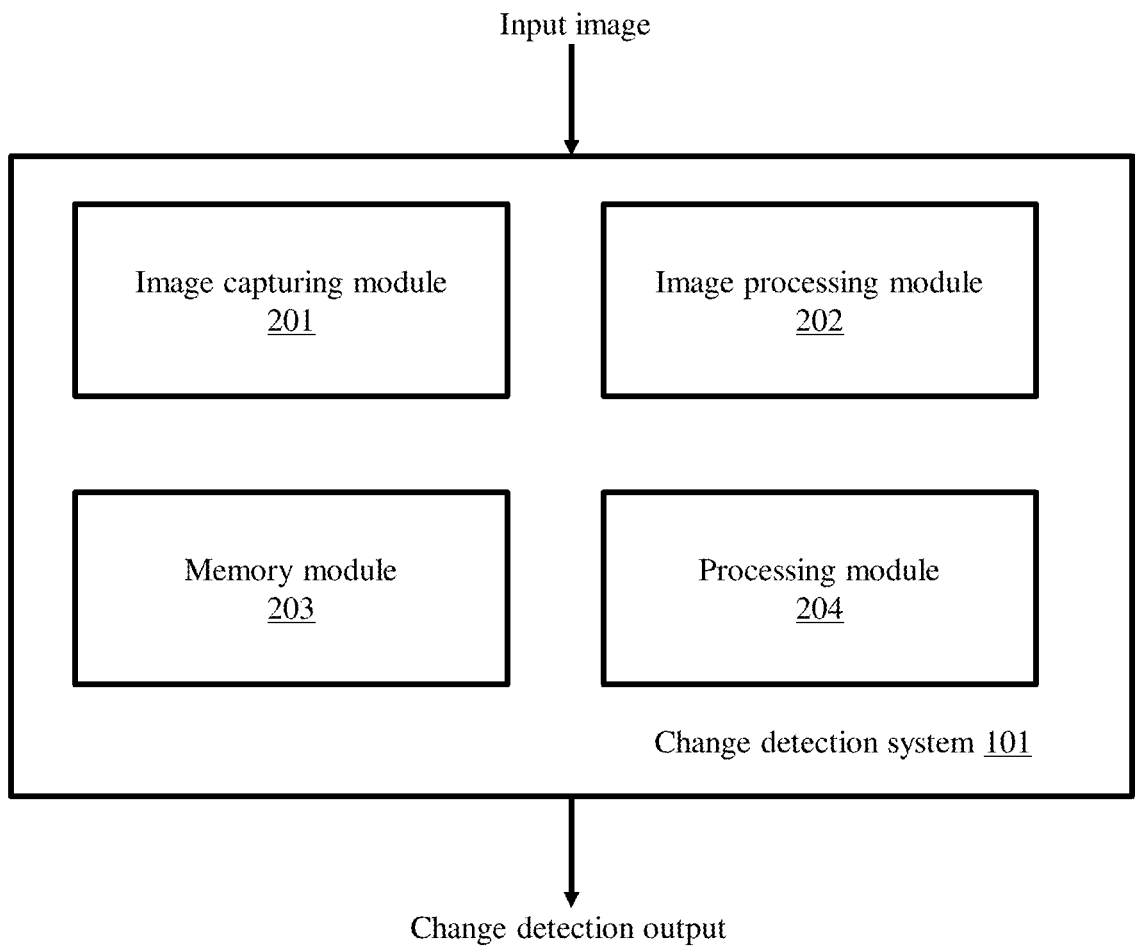
FIG. 2 is a functional block diagram that depicts components of change detection system of the UV, according to some embodiments of the present disclosure.

FIG. 2 is a functional block diagram that depicts components of change detection system of the UV, according to some embodiments of the present disclosure. The change detection system 101 includes an image capturing module 201, an image processing module 202, a memory module 203, and a processing module 204.

The image capturing module 201 is configured to trigger capturing of at least one image of a scene, for change detection, using a camera associated with the image capturing module 201. The image capturing module 201 then provides the captured at least one image as input to the image processing module 202.

The image processing module 202 compares the captured at least one image with a plurality of reference images stored in a database in the memory module 203, and performs a frame to frame mapping to identify a reference image that matches the captured at least one image. Further, for the captured image-reference image pair, the image processing module 202 generates a similarity map that highlights similarities between the captured at least one image and the reference image. The image processing module 202 generates the similarity map based on pixel based similarity and structural similarity. The pixel based similarity refers to similarity between the captured at least one image ($I_{test}$) and the corresponding reference image ($I_{ref}$) at pixel level, and the same is calculated as:

$$MSE(I_{test}, I_{ref}) = \frac{\sum_{x,y}(I_{test}(x,y) - I_{ref}(x,y))^2}{N} - \quad (1)$$

where 'N' is the total number of pixels in the image

The image processing module 202 computes the structural similarity (SSIM) at each pixel, using an appropriate technique such as sliding window. In this process, luminance, contrast, and structure in image patches are taken into account, and is represented as:

$$S(x,y) = \frac{(2\mu_x\mu_y + C_1)(2\sigma_x\sigma_y + C_2)}{(\mu_x^2 + \mu_y^2 + C_1)(\sigma_x^2 + \sigma_y^2 + C_2)} \quad (2)$$

Where S(x, y) is the structural similarity at pixel location (x, y), µ is the mean, σ is standard deviation, $\sigma_{xy}$ is cross correlation, and $C_1$, $C_2$ are constants.

The SSIM for the entire image is obtained by taking average of all local SSIM values. In an embodiment, SSIM value ranges between 0 and 1, and a higher value indicates more similarity. The image processing module 202 further computes a structural similarity map ($I_{SSIM}$) for the $I_{test}$-$I_{ref}$ pair, by obtaining structural similarity values at pixel level, using equation (2).

The image processing module 202 further performs the multi-scale super-pixel analysis to extract information pertaining to differences between $I_{test}$ and $I_{ref}$.

Multi-Scale Super-Pixel Analysis:

A super-pixel is generated by clustering nearby similar pixels. In the multi-scale super-pixel analysis, for an image, the super-pixels are generated at 'K' different scales, where the value of K is empirically chosen, and may be pre-configured with the memory module 203. For example, in an indoor use scenario, value of K may be relatively smaller as compared to that in an external use scenario. Based on such factors, value of K is decided. Further, at each scale, a change map is generated based on the super-pixel, and finally the change maps at all scales are combined to generate a combined change map. As super pixels contain maximum amount of information at corresponding scales of the image, the combined change map generated from the super-pixels contain detailed information which in turn help in identifying and extracting changes between the captured image and the reference image. The process in detail is given below:

Step 1: Choice of Scale Based on Gaussian Pyramid

For the $I_{test}$-$I_{ref}$ pair, and for the corresponding ISSIM, the image processing module 202 computes a Gaussian pyramid of the images at different scales. At each scale, the image processing module 202 determines a super-pixel based change map ICM by computing mean structural similarity within each super-pixel Sk using:

$$I_{CM}(S_k) = \text{mean}(I_{SSIM}(S_k)) \quad (3)$$

At each scale, change map is obtained by combining corresponding super-pixels, wherein the super pixels are combined by up-scaling and adding. Thus, for one $I_{test}$, multiple change maps are generated (one at each scale). Now, the image processing module 202 assigns a weight $\omega_n$ to each change map, as:

$$\omega_n = \frac{\exp\{m_n\}}{\sum_{c=1}^{N} \exp\{m_c\}} \quad (4)$$

where N is number of change maps corresponding to N scaling levels of the image, $m_j$ is the maximum intensity in the $j^{th}$ change map.

Here, the weightage indicates/represents contribution of each scale (scaled image) to the change map.

Step 2: Combined Change Map Generation:

Once the weightage for each change map is calculated and assigned, the image processing module 202 generates the combined change map by multiplying each of the change maps with corresponding weight factor, and then by adding them. The same is depicted in equation (5):

$$I_{C_{CM}} = \omega_1 I_{CM}^1 + \omega_2 I_{CM}^2 + \ldots + \omega_N I_{CM}^N \quad (5)$$

Where $I_{C_{CM}}$ is the combined change map, $I_{CM}^N$ is the $N^{th}$ change map. The combined change map is then used to perform the change detection.

The memory module 203 is configured to store all information associated with the change detection, permanently or temporarily, as per requirements. For example, data such as but not limited to reference image database, change detection history and results, and so on can be stored. The memory module 203 can use volatile and/or non-volatile storage means, based on requirements. The memory module 203 can be further configured to provide access to one or more of the stored data, for any authorized external entity and/or other components of the change detection system 101, upon receiving a data request. The memory module 203 can be further configured to deny access to data, if the entity that requests for data does not have appropriate data access rights.

The processing module 204 is in communication with the other components of the change detection system 101, and perform data processing with respect to one or more actions/functions to be performed by the other components of the change detection system 101, using one or more hardware processors.

Figure 3:
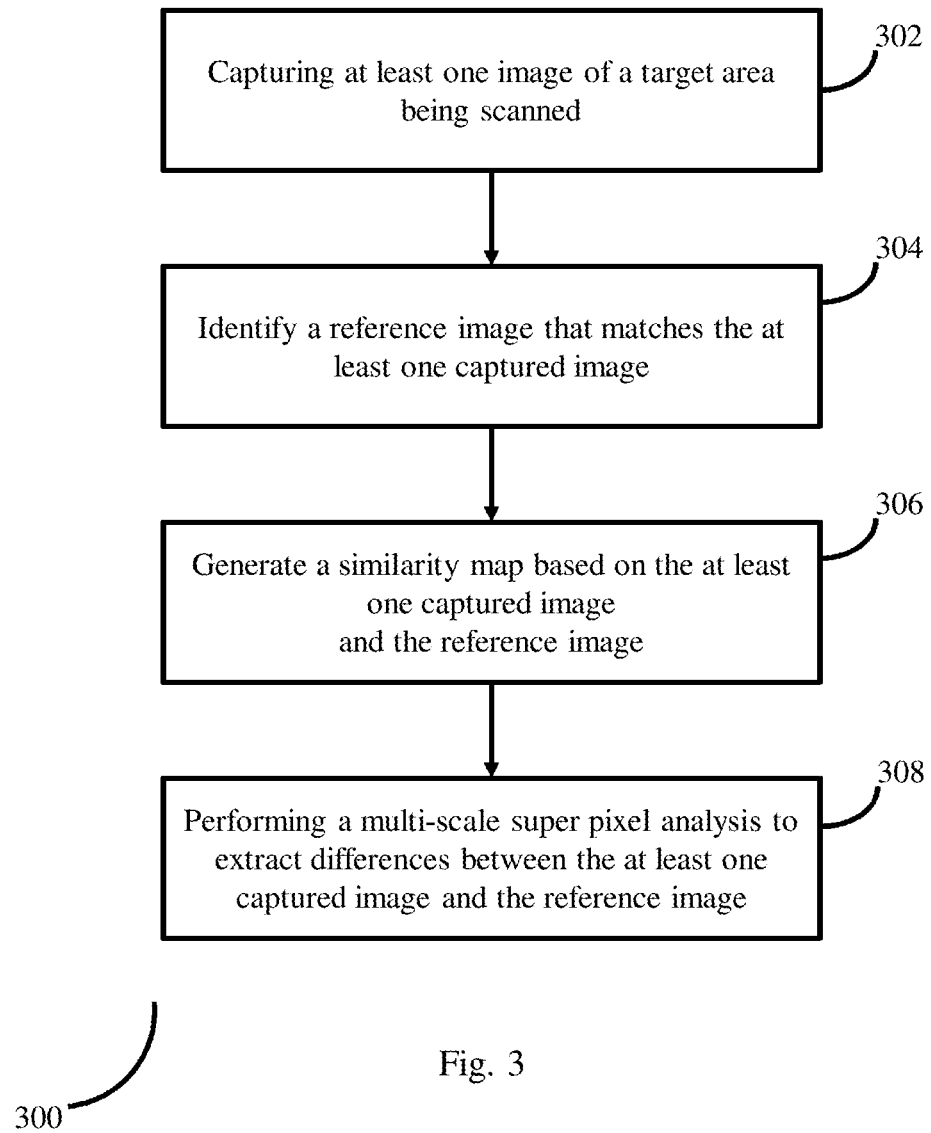
FIG. 3 is a flow diagram that depicts steps involved in the process of performing change detection using the UV, in accordance with some embodiments of the present disclosure.

FIG. 3 is a flow diagram that depicts steps involved in the process of performing change detection using the UV, in accordance with some embodiments of the present disclosure. The UV 100, when required to scan an area for inspection and in turns change detection, captures (302) at least an image of an area being scanned by the UV 100. As depicted in FIG. 1, the UV 100 may have a specific scanning range.

The UV 100 then processes the captured image ($I_{test}$) and identifies (304) a reference image ($I_{ref}$) that matches the captured image, from a database of reference images using similarity measures such as Structural Similarity Index (SSIM). For the $I_{test}$-$I_{ref}$ pair, the UV 100 generates (306) a similarity map, and then performs (308) a multi-scale super pixel analysis of the images to identify and extract details about differences between the two images. Various actions in FIG. 3 can be performed in the same order or in a different order. Further, or one or more of the actions in method 300 can be omitted.

Figure 4:
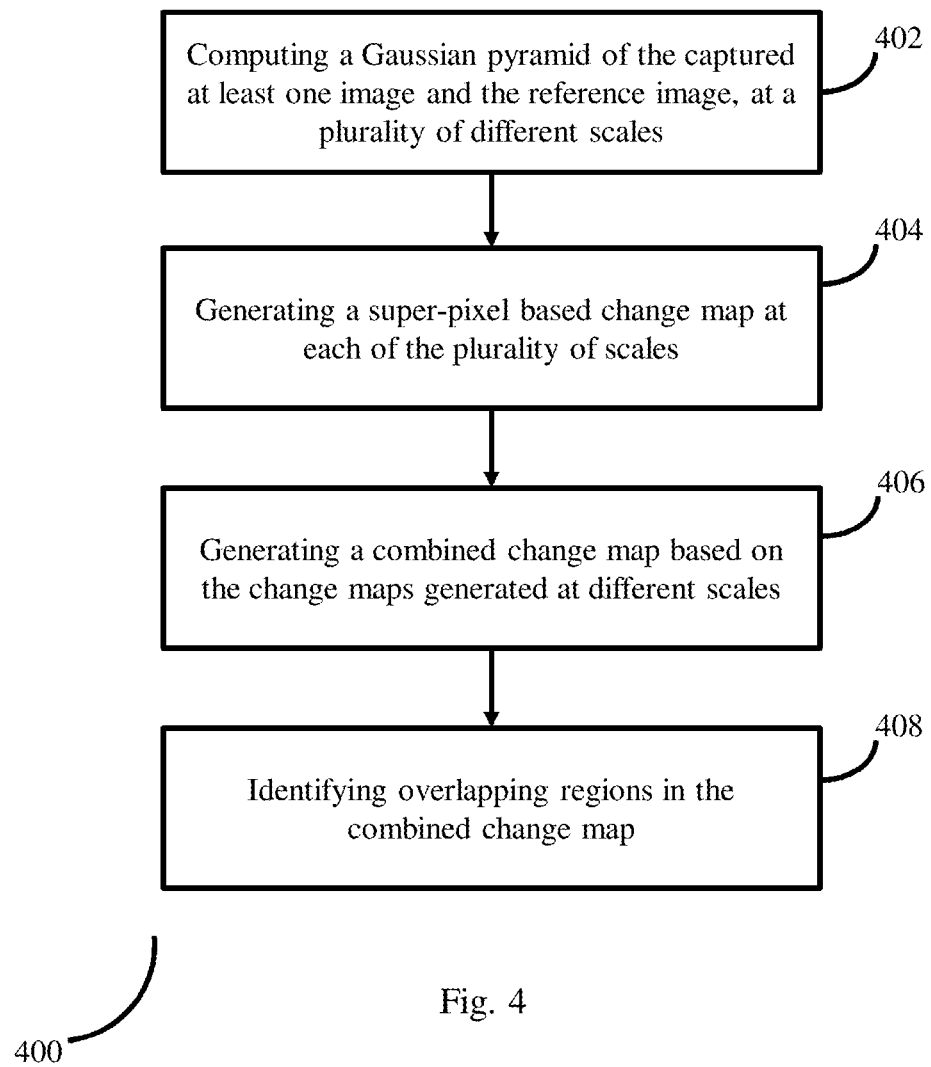
FIG. 4 is a flow diagram depicting steps involved in the process of multi-scale super pixel analysis adopted by the change detection system, according to some embodiments of the present disclosure.
Figure 5:
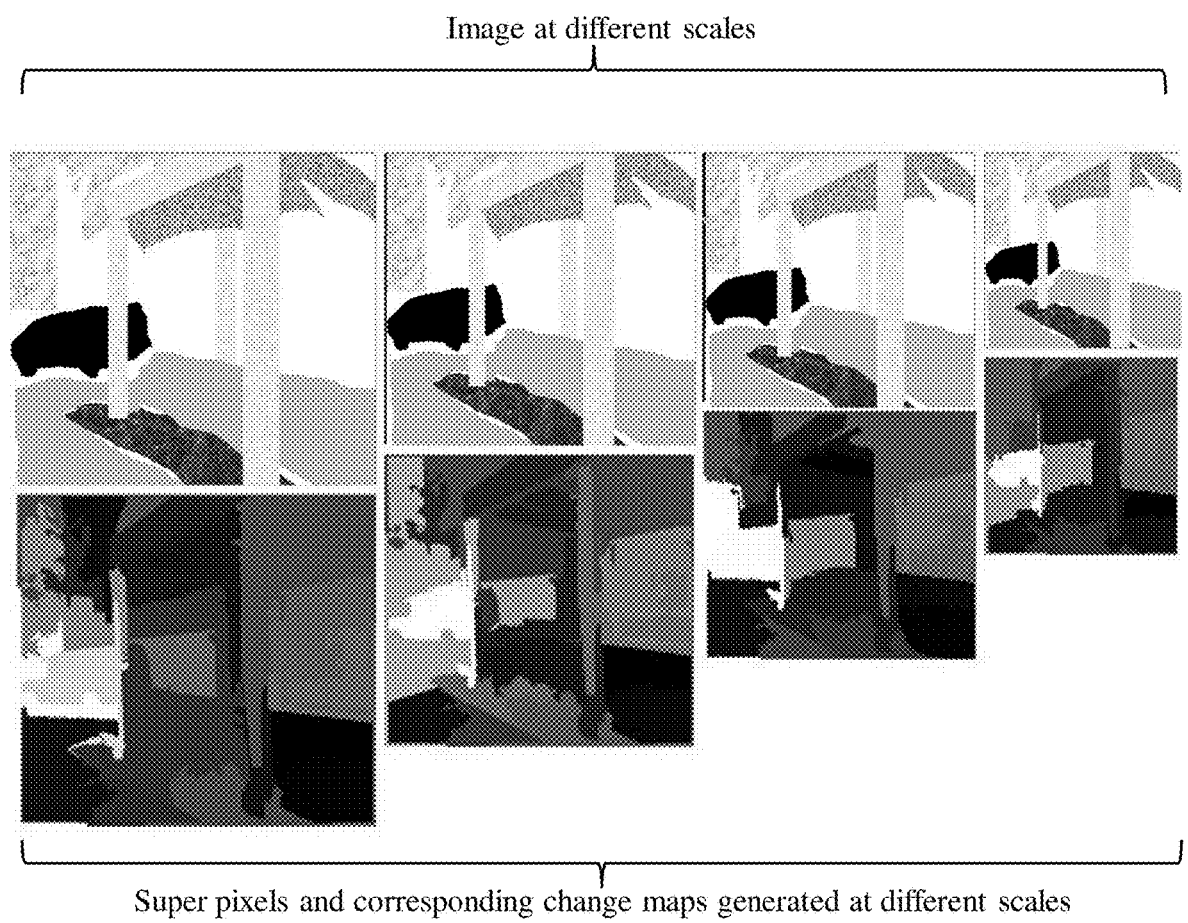
FIG. 5 is an example diagram depicting generation of super pixels and corresponding change maps for an image captured, at different scales, according to some embodiments of the present disclosure.
Figure 6:
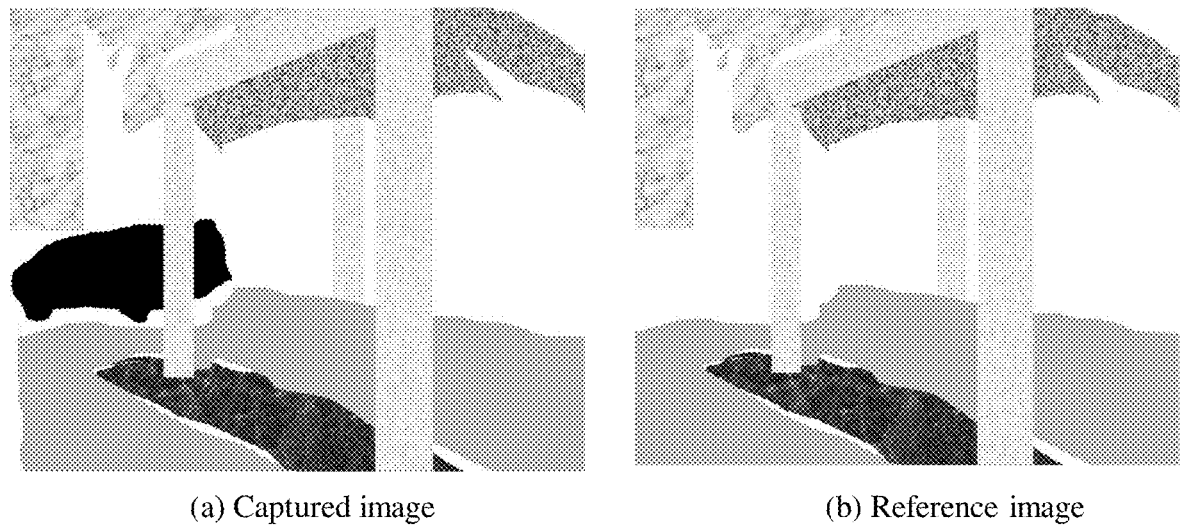
FIG. 6 is an example diagram depicting working of the change detection system in a use-case scenario, according to some embodiments of the present disclosure.
Figure 6:
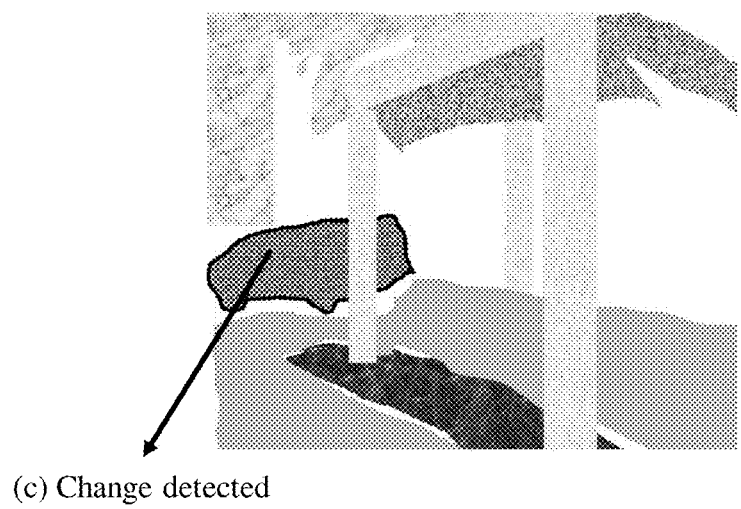

FIG. 4 is a flow diagram depicting steps involved in the process of multi-scale super pixel analysis adopted by the change detection system, according to some embodiments of the present disclosure. The UV 100 performs the multi-scale super pixel analysis of the images captured, so as to improve amount of information that can be extracted from the images, which in turn help perform the change detection. The UV 100, for the $I_{test}$-$I_{ref}$ pair, and for the corresponding ISSIM, computes (402) a Gaussian pyramid of the images at different scales. At each scale, the UV 100 generates (404) a super-pixel based change map ICM by computing mean structural similarity within each super-pixel $S_k$ (as in FIG. 5). At each scale, change map is obtained by combining corresponding super-pixels, wherein the super pixels are combined by up-scaling and adding. Thus, for one $I_{test}$, multiple change maps are generated (one at each scale), and the change maps thus obtained are used to obtain a set of super-pixel based change maps. The UV 100 then generates (406) a combined change by combining the change maps generated at different levels i.e. based on the set of super-pixel based change maps. In this process, the UV 100 initially assigns a weightage to each of the change maps (generated at different scales), the weightage could be based on contribution of each scale (scaled image) to the change map. The UV 100 then identifies (408) overlapping regions in the combined change map, and performs the change detection. By performing the change detection, the UV 100 highlights area in the captured image that is different as compared to the reference image (as in FIG. 6). Various actions in FIG. 4 can be performed in the same order or in a different order. Further, or one or more of the actions in method 400 can be omitted.

Experimental Results:

For testing the multi-scale super pixel based change detection, a data set including 152 different scene categories is selected. Each category has 2-41 pairs of annotated images. To begin with, frame matching is performed using SSIM, which gave 90.89% accuracy (i.e. out of 1087 test image pairs in the 152 categories, 988 pairs were correctly matched). The experiment was carried out to compare change detection under two variants:

1. Ability of the change detection system to detect change
2. Ability of the system to detect change area For the evaluation, 152 image pairs were selected (i.e. best matching image pair from each category). Using a pre-calculated threshold, it was identified that 92 out of 152 categories (60.53%) resulted in change detection overlap area of 60% or above. Results further indicates that more than 130 categories (85.5%) detected change with at least 10% overlap, and more than 40 categories (25%) resulted in area overlap of 90% or above.

Alternate Modes of Implementation:

It is possible to add the change detection system 101 that performs the multi-scale super pixel based change detection to any device apart from the Unmanned Vehicles (UV) to perform the change detection. For example, the change detection system 101 can be added as a component of a smartphone wherein for an image captured using camera of the smartphone, the multi-scale super pixel based change detection is performed by the change detection system 101.

In another mode of implementation, the change detection system 101 can be stand-alone device that can be carried by a user or may be attached to any other device/equipment/vehicle to perform the multi-scale super pixel based change detection as covered under the scope of claims and description provided.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for change detection using an Unmanned Vehicle (UV), comprising:
    capturing at least one image of a target, via one or more hardware processors;
    identifying a reference image that matches the captured at least one image, from a plurality of reference images, via the one or more hardware processors;
    generating a similarity map based on the captured at least one image and the reference image, via the one or more hardware processors, wherein the similarity map highlights changes between the captured at least one image and the reference image; and
    extracting differences between the captured at least one image and the reference image, by performing a multi-scale super pixel analysis of the similarity map, via the one or more hardware processors, wherein performing the multi-scale super pixel analysis of the similarity map comprises of:
        computing a Gaussian pyramid of the captured at least one image and corresponding reference image, at a plurality of different scales;
        generating super pixels for the at least one captured image, at each of the plurality of different scales;
        generating a super-pixel based change map, at each of the plurality of different scales, to obtain a set of super-pixel based change maps;
        generating a combined change map, based on the set of super-pixel based change maps; and
        identifying overlapping regions in the combined change map.

2. The method as claimed in claim 1, wherein the reference image that matches the captured at least one image is identified by performing frame matching of the captured at least one image with each of said plurality of reference images.

3. The method as claimed in claim 1, wherein generating the similarity map comprises of:
    computing structural similarity values between the captured at least one image with each of said plurality of reference images at pixel level; and
    generating the similarity map, based on the computed structural similarity values.

4. An Unmanned Vehicle (UV), comprising:
    a processor; and
    a memory module comprising a plurality of instructions, said plurality of instructions configured to cause the processor to:
    capture at least one image of a target, via one or more hardware processors, by an image capturing module of the UV;
    identify a reference image that matches the captured at least one image, from a plurality of reference images, via the one or more hardware processors, by an image processing module of the UV;
    generate a similarity map based on the captured at least one image and the reference image, via the one or more hardware processors, by the image processing module, wherein the similarity map highlights changes between the captured at least one image and the reference image; and
    extract differences between the captured at least one image and the reference image, by performing a multi-scale super pixel analysis of the similarity map, via the one or more hardware processors, by the image processing module, wherein the image processing module is configured to perform the multi-scale super pixel analysis of the similarity map by:
    computing a Gaussian pyramid of the captured at least one image and corresponding reference image, at a plurality of different scales;
        generating super pixels for the at least one captured image, at each of the plurality of different scales;
        generating a super-pixel based change map, at each of the plurality of different scales, to obtain a set of super-pixel based change maps;
        generating a combined change map, based on the set of super-pixel based change maps; and
        identifying overlapping regions in the combined change map.

5. The UV as claimed in claim 4, wherein the image processing module is configured to identify the reference image that matches the captured at least one image, by performing frame matching of the captured at least one image with each of said plurality of reference images.

6. The UV as claimed in claim 4, wherein the image processing module is configured to generate the similarity map by:
    computing structural similarity values between the captured at least one image with each of said plurality of reference images at pixel level; and
    generating the similarity map, based on the computed structural similarity values.

7. One or more non-transitory machine readable information storage mediums comprising one or more instructions which when executed by one or more hardware processors causes:

capturing at least one image of a target, via one or more hardware processors;

identifying a reference image that matches the captured at least one image, from a plurality of reference images, via the one or more hardware processors;

generating a similarity map based on the captured at least one image and the reference image, via the one or more hardware processors, wherein the similarity map highlights changes between the captured at least one image and the reference image; and extracting differences between the captured at least one image and the reference image, by performing a multi-scale super pixel analysis of the similarity map, via the one or more hardware processors, wherein the multi-scale super pixel analysis of the similarity map, comprising:

computing a Gaussian pyramid of the captured at least one image and corresponding reference image, at a plurality of different scales;

generating super pixels for the at least one captured image, at each of the plurality of different scales;

generating a super-pixel based change map, at each of the plurality of different scales, to obtain a set of super-pixel based change maps;

generating a combined change map, based on the set of super-pixel based change maps; and identifying overlapping regions in the combined change map.

8. The one or more non-transitory machine readable information storage mediums of claim 7, wherein the one or more instructions which when executed by the one or more hardware processors cause identification of the reference image that matches the captured at least one image by performing frame matching of the captured at least one image with each of said plurality of reference images.

9. The one or more non-transitory machine readable information storage mediums of claim 7, wherein the one or more instructions which when executed by the one or more hardware processors cause generation of the similarity map by:

computing structural similarity values between the captured at least one image with each of said plurality of reference images at pixel level; and generating the similarity map, based on the computed structural similarity values.

\* \* \* \* \*